Jan. 29, 1952  F. O'CONNOR  2,583,589
ELECTRIC CURRENT GENERATOR
Filed June 21, 1950
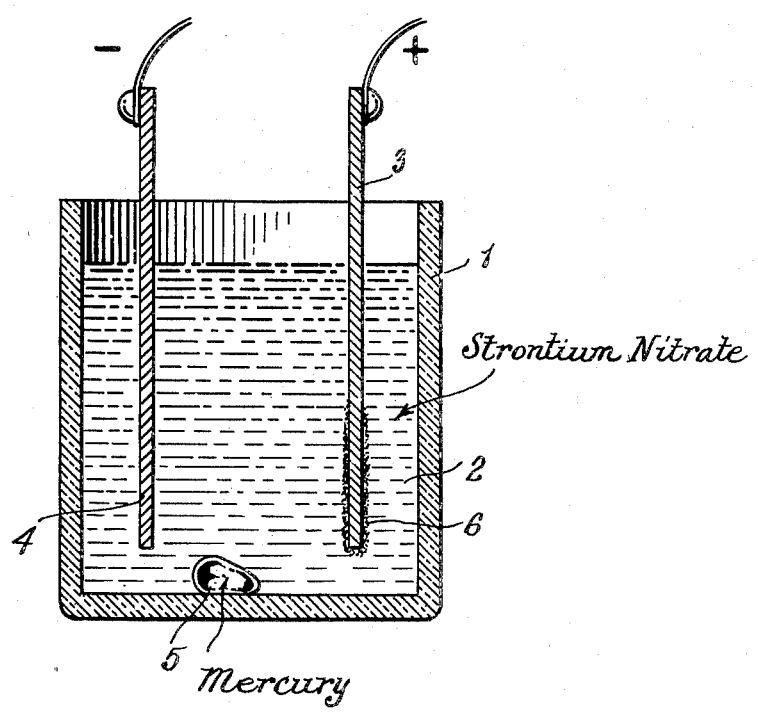

Patented Jan. 29, 1952

2,583,589

UNITED STATES PATENT OFFICE 2,583,589

ELECTRIC CURRENT GENERATOR

Frank O'Connor, New York, N. Y.

Application June 21, 1950, Serial No. 169,407

5 Claims. (Cl. 136—100)

This invention relates to electric current generators, and has for its object the provision of a generator made of readily-available materials and of simple construction, and effective in the production of uniform electric current.

More particularly, the invention contemplates the provision of a receptacle in which a positive and a negative electrode are supported, the positive electrode being preferably composed of aluminum and the negative electrode made of copper or of other similar conductive material. A fluid, constituting an electrolyte is contained in the receptacle and the electrodes are immersed in such fluid which consists of a strontium nitrate, barium nitrate and acetic acid solution. In addition, a relatively small amount of mercury is contained within the receptacle surrounded by the strontium nitrate, barium nitrate and acetic acid solution. The mercury is attracted to the positive or aluminum electrode and a process of deterioration or decomposition of said coated electrode occurs, resulting in the generation of electric current which will continue until the electrode is destroyed or at least nearly completely decomposed. The current flow is uniform and the device is easily constructed and handled and will operate under various working conditions for various purposes where an electric current is needed.

With these and other objects to be hereinafter set forth in view, I have devised the particular arrangement of parts described and more particularly pointed out in the claims appended hereto.

In the accompanying drawing, wherein an illustrative embodiment of the invention is disclosed, the figure shown is a sectional view showing a current generator constructed in accordance with the invention.

In the drawing, 1 indicates a suitable receptacle or container in which the electrolyte is contained, such receptacle being composed of glass, Bakelite, hard rubber or any other suitable non-conducting material. My invention is not limited to a non-conducting material to be used as a suitable receptacle, but conducting materials such as metal receptacles may also in some cases be used to more advantage. Contained within the receptacle is a substantial quantity of the electrolyte, the same consisting of a solution 2 of strontium nitrate, barium nitrate, acetic acid and water, the strontium nitrate, barium nitrate and acetic acid being initially in powder or crystal form and being dissolved in the water. The positive electrode is shown at 3, the same consisting of a sheet, strip, bar or rod of aluminum supported in any suitable manner to enable a substantial portion of it to be located in and surrounded by the electrolyte 2. The negative electrode is shown at 4 and the same may be of copper or other suitable metal and is immersed in the strontium nitrate, barium nitrate and acetic acid solution and spaced from the positive electrode 3. Also contained in the receptacle and surrounded by the electrolyte 2, is a quantity of mercury appearing as the globule 5 in the drawing.

When the electrodes are connected to an ammeter it will be found that a substantial flow of electrical current is attained. The strontium nitrate, barium nitrate and acetic acid 2 causes adherence or coating of the aluminum electrode by the mercury as shown at 6 and a decomposition or deterioration of that electrode gradually occurs, resulting in the current generation, which current is maintained until the electrode is destroyed, with the result that the generator is long-lived and continuous in operation for a very substantial period of time. The electrolyte employed is readily available, is not destructive of materials or injurious to the skin, and a very substantial amount of current is generated by a relatively small positive electrode and overall portability of the device is secured.

While I have herein described one embodiment of the invention, it is obvious that the same is not to be restricted thereto, but is broad enough to cover all structures coming within the scope of the annexed claims.

What I claim is:

1. A current generator comprising a container, an aluminum electrode located therein and surrounded by an electrolyte consisting of a solution of strontium nitrate and mercury.

2. A current generator comprising a container, an aluminum electrode located therein and surrounded by an electrolyte consisting of a solution of strontium nitrate, barium nitrate, acetic acid and mercury.

3. An electrical current generator comprising a container, a strontium nitrate, barium nitrate and acetic acid solution contained therein, an aluminum electrode located in the container and immersed in the electrolyte, and mercury contained in the receptacle and surrounded by the electrolyte.

4. An electrical generator comprising, an aluminum positive electrode immersed in a solution of strontium nitrate, barium nitrate, acetic acid containing mercury.

5. An electrical generator comprising, a receptacle, a solution of strontium nitrate, barium nitrate and acetic acid therein contained, a globule of mercury contained in the strontium nitrate, barium nitrate and acetic acid solution, an aluminum positive electrode contained in the receptacle and immersed in the strontium nitrate, barium nitrate and acetic acid solution, and a negative electrode of metal also immersed in the strontium nitrate, barium nitrate and acetic acid solution.

FRANK O'CONNOR.

No references cited.